United States Patent [19]
Umeda et al.

[11] Patent Number: 5,723,973
[45] Date of Patent: Mar. 3, 1998

[54] GENERATING APPARATUS

[75] Inventors: Atsushi Umeda, Anjo; Makoto Taniguchi, Obu; Hirohide Sato, Toyokawa; Shin Kusase, Obu, all of Japan

[73] Assignee: Nippondenso Co., Ltd., Kariya, Japan

[21] Appl. No.: 627,478

[22] Filed: Apr. 4, 1996

[30] Foreign Application Priority Data

Apr. 24, 1995 [JP] Japan .................. 7-098978

[51] Int. Cl.$^6$ .................................. H02P 9/00
[52] U.S. Cl. .................. 322/20; 322/28; 322/91
[58] Field of Search ............... 322/25, 26, 27, 322/28, 20; 363/34

[56] References Cited

U.S. PATENT DOCUMENTS

| | | | |
|---|---|---|---|
| 4,641,075 | 2/1987 | Asano et al. | 318/811 |
| 4,825,139 | 4/1989 | Hamelin et al. | 322/90 |
| 5,177,677 | 1/1993 | Nakata et al. | 363/89 |
| 5,245,522 | 9/1993 | Kawaguchi et al. | 363/37 |
| 5,418,401 | 5/1995 | Kaneyuki | 307/10.1 |
| 5,430,639 | 7/1995 | Takahashi | 363/124 |
| 5,543,703 | 8/1996 | Kusase et al. | 322/16 |

FOREIGN PATENT DOCUMENTS

| | | |
|---|---|---|
| 251916 | 1/1988 | European Pat. Off. . |
| 545454 | 6/1993 | European Pat. Off. . |
| 582 470 | 2/1994 | European Pat. Off. . |
| 660501 | 6/1995 | European Pat. Off. . |
| 6-284657 | 10/1994 | Japan . |
| 9207406 | 4/1992 | WIPO . |

*Primary Examiner*—Thomas M. Dougherty
*Assistant Examiner*—Nicholas Ponomarenko
*Attorney, Agent, or Firm*—Cushman, Darby & Cushman IP Group of Pillsbury, Madison & Sutro LLP

[57] ABSTRACT

Leading current or lagging current of an alternator is supplied by a simple structure including short-circuit switch elements. The short-circuit switch elements are connected across output terminals of the alternator three-phase armature windings, and are turned on and off at fixed timings to supply a suitable amount of the leading current to armature windings regardless of the rotational speed. Thus, the leading current can be supplied without phase-leading-capacitors so that the apparatus can be made compact, lightweight and powerful. Even if any of the short-circuit switch elements can not turn off, the battery discharge can be prevented.

22 Claims, 8 Drawing Sheets

GENERATING APPARATUS

CROSS REFERENCE TO RELATED APPLICATION

The present application is based on and claims priority from Japanese Patent Application No. Hei 7-98978 filed on Apr. 24, 1995, the contents of which are incorporated herein by reference.

BACKGROUND OF THE INVENTION

1. Field of the Invention

The present invention relates to a generating apparatus for a vehicle.

2. Description of the Related Art

Alternators for vehicles have been required to be smaller, lighter and more powerful in recent years in order to save the installation space.

In a conventional three-phase vehicle alternator of a leading current type, phase-advancing capacitors are connected between output terminals to supply the respective armature windings with leading current (current which changes ahead of voltage) in order to increase output power.

However, in the above mentioned leading current type alternator, the leading current is a function of frequency or rotational speed and, therefore, decreases in low rotational speed situations. Meanwhile, in these situations, current increases are required, especially when the alternator is used in a vehicle. Moreover, because the inductance of the alternator is large, capacitors with large capacity are necessary, with the result that large size capacitors required.

SUMMARY OF THE INVENTION

The present invention has been made in view of the above problem and has an object of providing a compact and lightweight alternator which can supply leading current as well as lagging current without needing the capacitors required by the prior art.

Another object of the present invention is to provide an alternator which supplies desired leading or lagging current independent of the rotational speed.

Another object of the present invention is to provide a generating apparatus including an alternator with multi-phase armature windings, and an AC-DC power converting unit. The generating apparatus comprises semiconductor switching elements as means for short-circuiting fixed terminals of the armature windings and also comprises means for turning on and off the semiconductor switching elements, thereby controlling the output power.

Each of the semiconductor switching elements is connected between a designated pair of terminals of the alternator and is turned on and off at a fixed timing to supply current (leading current or lagging current) which has a phase different from the phase of the voltage generated in the armature windings.

The AC-DC power converting means may include a full-wave rectifying unit composed of diodes or a two-way switching circuit.

Another object of the present invention is to provide a generating apparatus which has a three-phase alternator and a phase-short-circuiting means composed of Δ-connected semiconductor switching elements or star connected elements.

Each of the semiconductor switching elements may be composed of a pair of one-way semiconductor switching elements connected in parallel so that one allows current to flow in a direction opposite to the other.

Another object of the present invention is to provide a generating apparatus in which the control means turns on one of the semiconductor switching elements at a set time for a fixed conducting period which corresponds to a set leading current. The control means turns on the semiconductor switching elements when a voltage difference between an output terminal of the armature windings and either a higher-voltage-terminal of a DC-voltage-source or a lower-voltage-terminal of a DC-voltage-source of the AC-DC power converting means becomes smaller than an absolute value, and turns off the semiconductor switching elements a fixed short-circuit time after the voltage difference between an output terminal of the armature windings and either a higher-voltage-terminal of a DC-voltage-source or a lower-voltage-terminal of a DC-voltage-source of the AC-DC power converting means becomes smaller than an absolute value.

Thus, the leading current can be provided without a phase-leading capacitor and a simple, compact, lightweight apparatus with increased output power can be provided. In addition, a generation apparatus which can supply desired leading current irrespective of the rotational speed can be provided. Further, lagging current can be also supplied so that the output power can be reduced with the field current being constant. If the leading current is not required, the leading current can be stopped, thereby preventing ineffective current. Even if the AC-DC power converting means fails to turn off, the battery is prevented from discharging to death.

When the short-circuit switch is turned on, the short-circuit current which is not otherwise available can be supplied to the battery by the AC-DC power converting means, so that continuous armature current approximating the sinusoidal wave can be supplied, resulting in a stable magnetic field to increase the alternator output power. That is, when the generator current is necessary, current is supplied to approximate the sinusoidal wave for a limited period in the zero-generator-current period, so that the output power increases without excessive leading current. At the same time, vibration or noise of the alternator can be reduced.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Preferred embodiments according to the present invention will now be described with reference to the appended drawings.

(First Embodiment)

Figure 1:
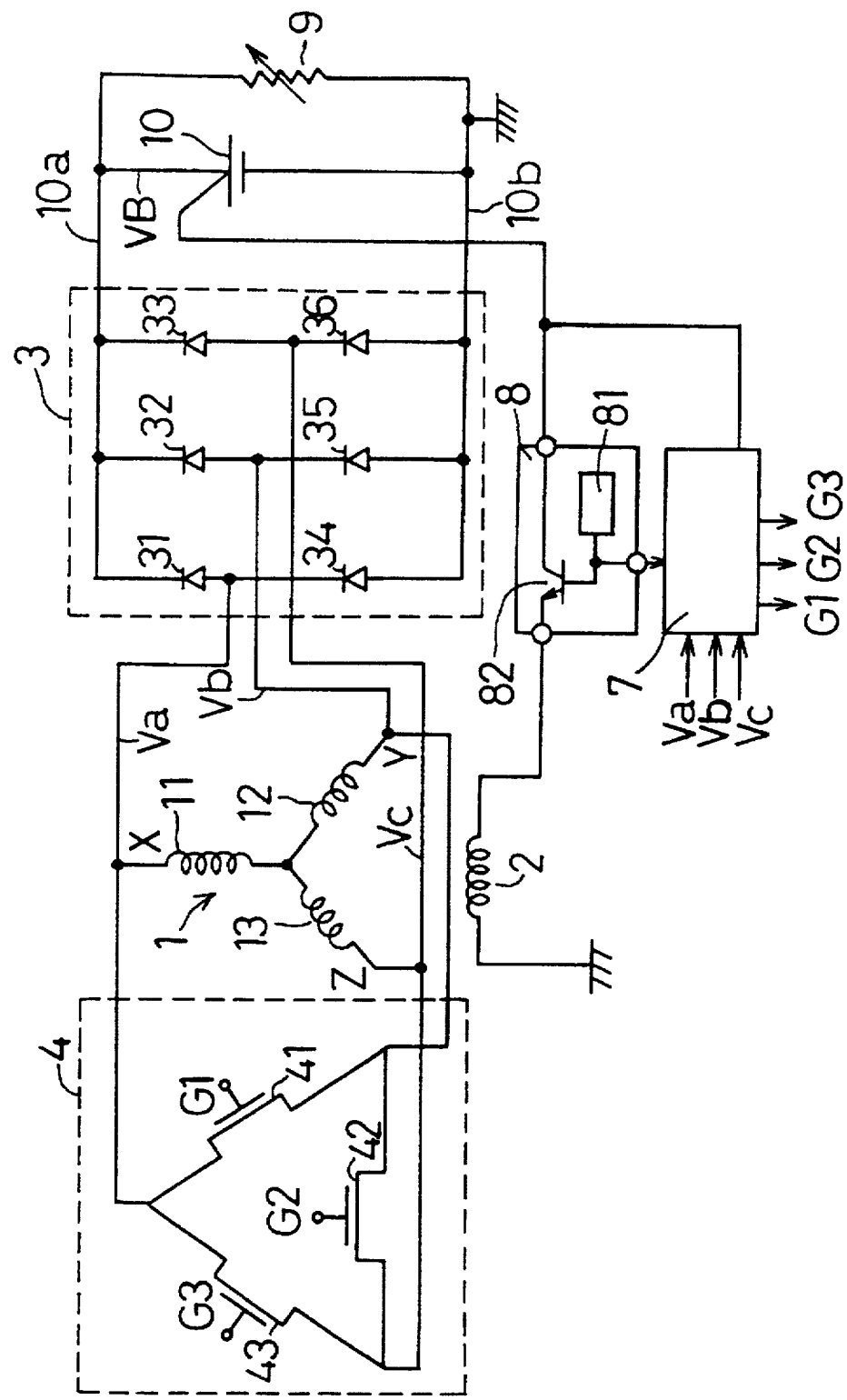
FIG. 1 is a circuit diagram showing a first embodiment of an alternator for a vehicle according to the present invention.

A first embodiment is described with reference to FIG. 1.

A generating apparatus for a vehicle is composed of a three-phase synchronous generator or an alternator 1 having Lundell type field poles, a three-phase full-wave rectifier or AC-DC power converting means 3, a short-circuiting circuit or short-circuiting means 4, a controller 7 which controls the short-circuiting circuit 4 and a regulator 8 for controlling the field current.

The alternator 1 is driven by an engine, and has three phase armature windings 11-13 and a field coil 2 which is wound around a rotor core. Three-phase AC voltages Va, Vb and Vc are generated in the armature windings 11-13 when a field current is supplied to the field coil 2 by the regulator 8 as in the well-known manner.

The controller 7 has a microcomputer (not shown) therein and controls respective short-circuit switches 41-43 of the short-circuiting circuit 4 according to battery voltage VB and the output voltage (phase-voltage) Va, Vb and Vc of the armature windings 11-13 to supply the respective armature windings 11-13 with a fixed amount of leading current at a fixed timing.

The regulator 8 has a conducting-ratio-setting-circuit 81 which compares the battery voltage VB with a reference voltage and sets the conducting ratio of a switching transistor 82, which supplies the field current If to the field coil 2.

The three-phase full-wave rectifier 3 is a common type, which rectifies the output current of the alternator 1 to be supplied to a battery 10 and an electric load 9. The rectifier 3 has a high-level DC source line 10a and a low-level DC source line 10b which is grounded.

Figure 2:
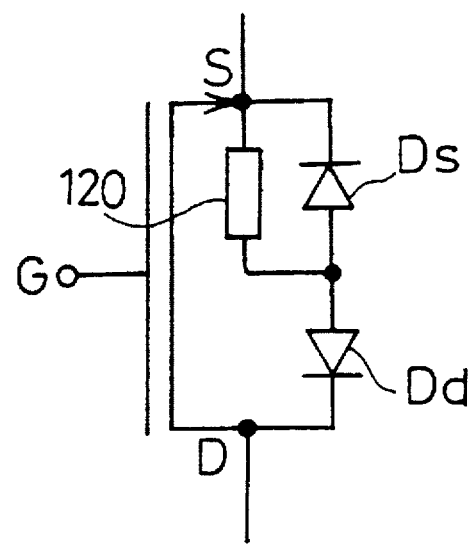
FIG. 2 is an equivalent circuit of a MOSFET in the first embodiment.

The short-circuiting circuit 4 is composed of the short-circuit switches 41-43 which are power MOSFETs made from SiC and form a Δ (delta)-connected circuit. Each junction of the Δ-connected short-circuit switches is connected to a corresponding one of the output terminals of the armature windings 11-13. Each MOSFET has a high resistance resistor 120 connected in parallel with a parasitic diode Ds formed in the source S as shown in FIG. 2. A parasitic diode Dd is formed in the drain D shown in FIG. 2. The high resistance resistor 120 prevents conduction of the parasitic diodes and controls short-circuit current in both directions.

An example of operation of the above apparatus is described next.

When the electric load 9 is small, the battery voltage VB is controlled by the regulator 8 only. Since the power control by the field-current-control-type regulator 8 and the rectifying operation of the three-phase full-wave rectifier 3 are well known, their description is omitted.

When the electric load 9 increases and the duty ratio becomes higher than a fixed value, the controller 7 controls the short-circuiting circuit 4 to provide the leading current, which is described hereafter.

Figure 3:
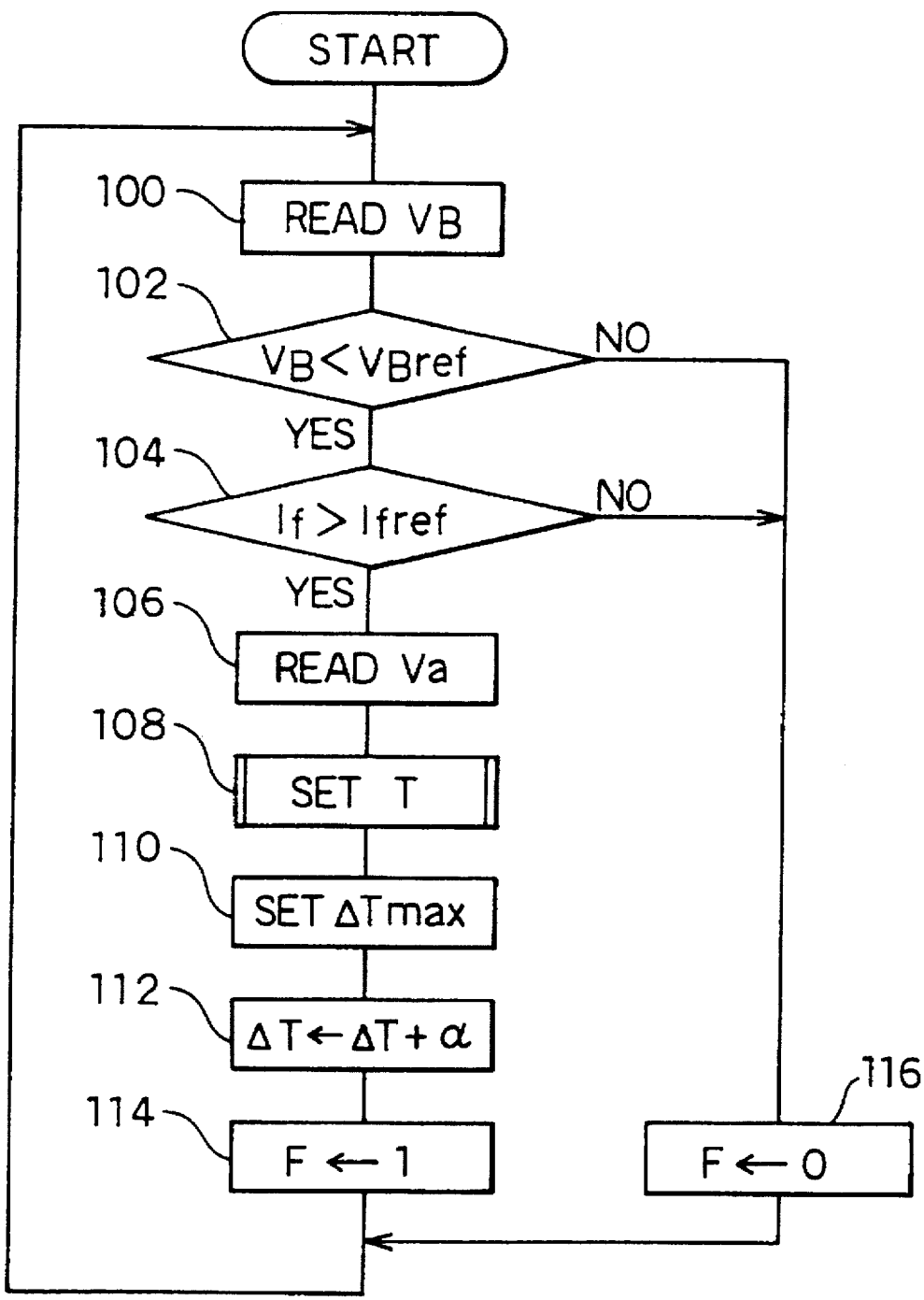
FIG. 3 is a flow chart showing operation of a controller in the first embodiment.

The leading current is described with reference to flow charts shown in FIG.3–FIG. 5. Incidentally, the phase voltage Va is generated ahead of the phase voltage Vb by an angle of 120 degrees, and the phase voltage Vb is generated ahead of Vc by an angle of 120 degree. In order to simplify discussion, the voltage drops of the diodes 31-36 in the forward direction are neglected here.

At the beginning, the battery voltage VB is read in a step 100, and whether the battery voltage VB is lower than a fixed voltage VBref or not is examined in a step 102. If higher (NO), a step 116 follows and if lower (YES), whether the field current If is higher than a fixed value Iref or not is examined in a step 104. If it is lower (NO), a step 116 follows and if higher (YES), heavy load condition or insufficient generation is assumed and the phase voltage Va is read in a step 106. Subsequently, a cycle time T is determined from the wave form of the phase voltage Va in a step 108. The cycle time may be determined from a time between the adjacent peaks of the voltage Va or double of a time between the adjacent zero-cross points of the phase voltage Va. A maximum short-circuit time ΔTmax of a leading-current-supply time or short-circuit time is determined from the cycle T in a step 110. The maximum short-circuit time ΔTmax is calculated by multiplying the cycle time T by a fixed ratio k. As the cycle time T becomes shorter in the alternator for a vehicle (or the rotational speed becomes higher), the starting-up of the alternator output voltage is improved, and the leading current supply time, in which supply of the leading current is desired, is shortened so that the fixed ratio k can be made smaller with decrease of the cycle time. Subsequently, a fixed value α is added to the short-circuit time or delay time ΔT, which is the leading-current-supply time, to go to a step 114. Incidentally, a register which stores the short-circuit time ΔT is reset to zero when the routine is starting in the step 112.

In the step 114, the flag is set to 1 to execute a short-circuiting (leading current supply) subroutine, which is described hereafter. The flag is reset to 0 in a step 116.

The above short-circuiting (leading current supply) subroutine is described with reference to FIG. 4 and FIG. 5. The subroutine is an interruption routine which is executed at a regular interval in preference to others, and the execution cycle is, for example, 2% of the cycle period T determined in the step 108.

At the beginning, whether the flag F commanding the short-circuit control is 1 or not is examined in a step 200. If it is 0 (NO), the process returns to the main routine shown in FIG. 3, assuming that no execution command of the short-circuit control is given. On the other hand, if it is 1 (YES), the process proceeds to a step 201, assuming that the execution command of the short-circuit control is given.

The phase voltages Va, Vb and Vc are read in the step 201 to examine whether the phase voltage Va is lower than the battery voltage VB or not (202). If it is not lower (NO), the process proceeds to a step 203 and if it is lower (YES), the process goes to a step 212. In the step 203, whether the phase voltage Va is higher than the ground voltage VE (=0 V) or not is examined. If it is not, the process goes to the step 204 and if it is higher (YES), the process proceeds to the step 212. In the step 212, a timer a is started to set a conducting time of the short-circuit switch 41, which is turned on immediately in a step 214, and a step 300 (shown in FIG. 5) follows.

In the step 204, the process checks whether the phase voltage Vb is lower than the battery voltage VB or not, and goes to a step 206 if it is not lower (NO) or goes to a step 216 if it is lower (YES). In the step 216, a timer b is started to set the conducting time of the short-circuit switch 42, which is immediately turned on in a step 218, and the process goes to a step 300 (shown in FIG. 5).

The process examines whether the phase voltage Vc is lower than the battery voltage VB or not in the step 208, and proceeds to a step 210 if it is not lower, or to a step 220 if it is lower (YES). The process examines whether the phase voltage Vc is higher than the grounded voltage VE (=0 V) or not in the step 210, and goes to a step 300 (shown in FIG. 5) if it is not higher, or goes to the step 220 if it is higher (YES).

In the step 220, a timer c is started to set the conducting time of the short-circuit switch 43, which is immediately turned on in a step 222. Then the step 300 shown in FIG. 5 follows.

Figure 4:
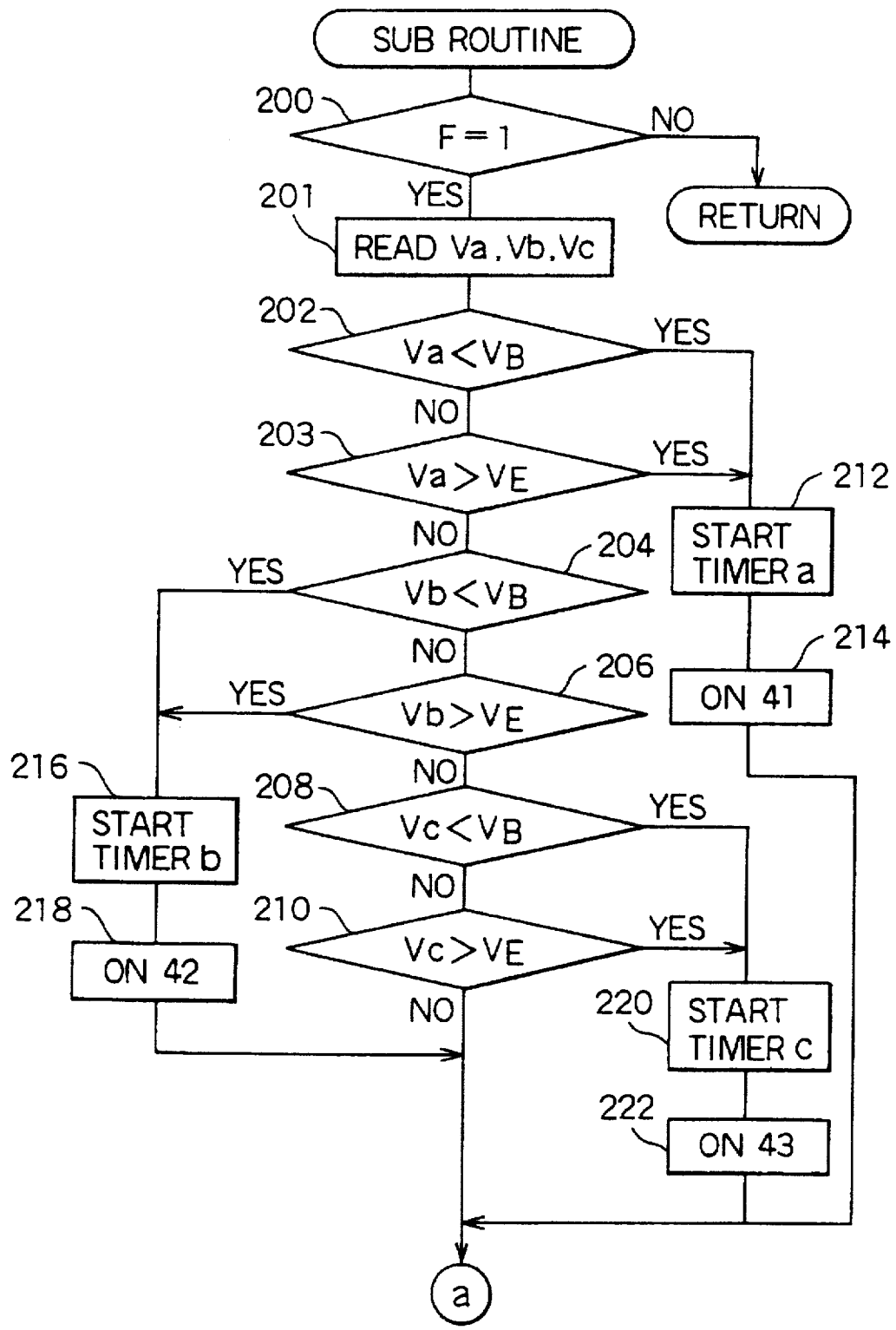
FIG. 4 is a flow chart showing operation of a controller in the first embodiment.
Figure 5:
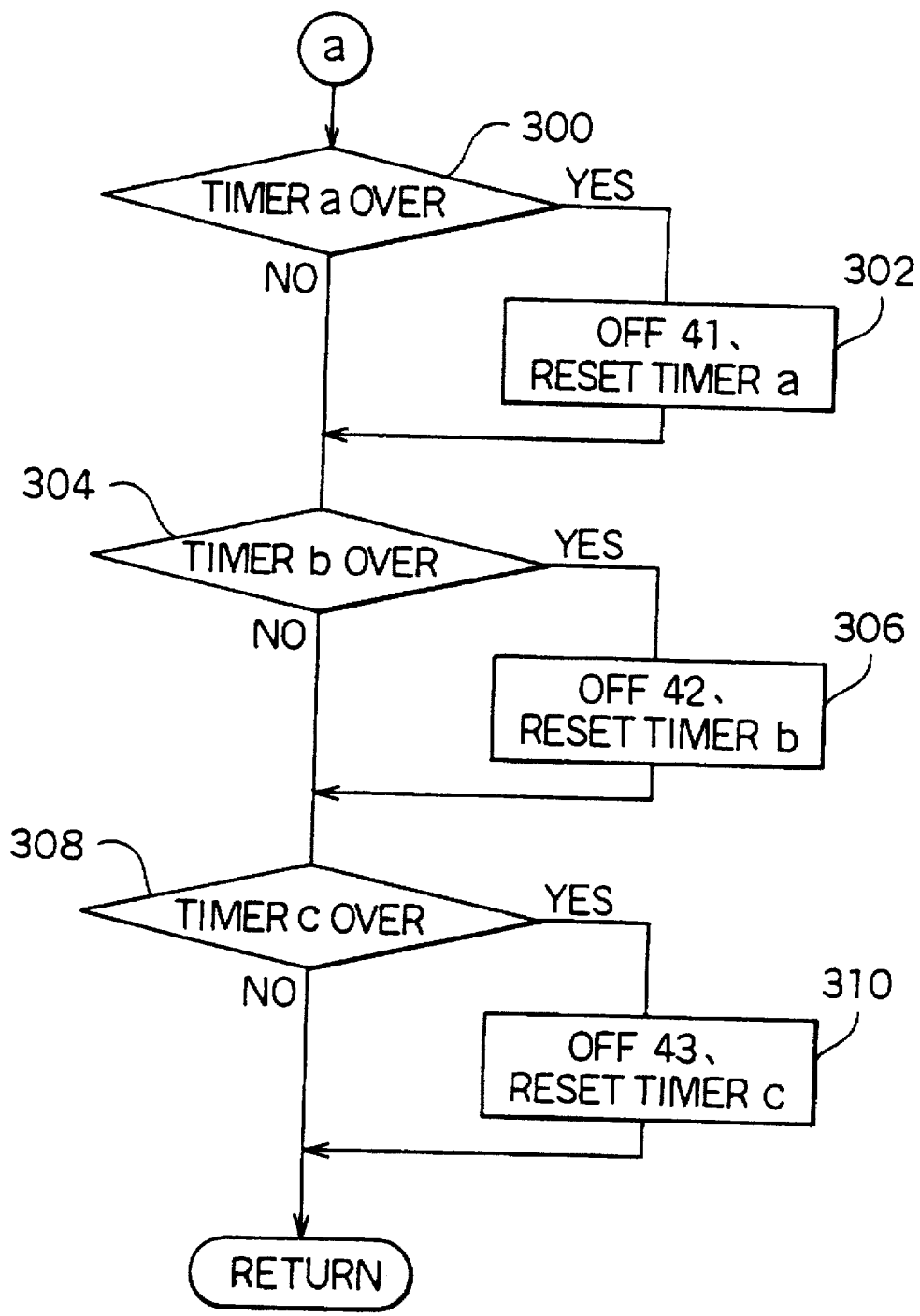
FIG. 5 is a flow chart showing operation of a controller in the first embodiment.

The step 300 follows immediately after the steps 214, 222 or 218, because the routine shown in FIG. 4 and FIG. 5 is executed regularly and frequently, and the short-circuit switches 41–43 are not turned on at the same time during one cycle of the routine on account of the phase differences thereof. The timers a, b and c are set to have the short-circuit time $\Delta T$ which are calculated in the step 112.

In the step 300, whether the timer a has counted a number corresponding to the short-circuit time $\Delta T$ or not is examined. The process goes to a step 304 if it has not (NO), or turns off the short-circuit switch 41 and resets the timer a (302), and goes to the step 304 if it has counted the number.

In the step 304, whether the timer b has counted a number corresponding to the short-circuit time $\Delta T$ or not is examined. The process goes to a step 308 if it has not, or turns off the short-circuit switch 42 and resets the timer b in a step 306, and goes to the step 308 if it has counted the number.

In the step 308, whether the timer c has counted a number corresponding to the short-circuit time $\Delta T$ or not is examined. The process returns to the main routine shown in FIG. 3 if it has not, or turns off the short-circuit switch 43 and resets the timer c in a step 310 and, subsequently, returns to the main routine if it has counted the number.

Incidentally, if the routine is repeated at an excessively high speed, the short-circuit time increases too fast. Therefore, the short-circuit time is increased step by step in the step 112 at a suitable interval.

Figure 6:
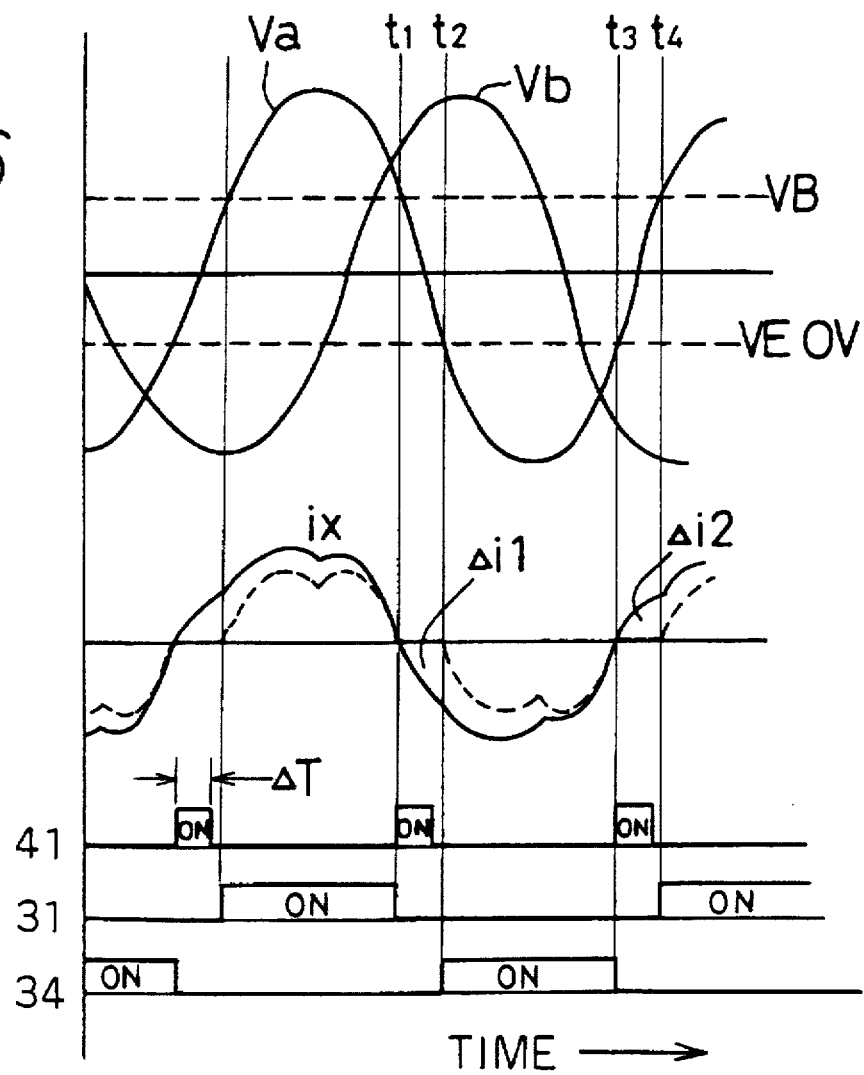
FIG. 6 is a timing chart showing a relationship between phase voltages of armature windings, current of an armature winding and conducting timing of a short-circuiting circuit.

Thus, the leading currents (short-circuit current) are applied into the respective armature windings 11–13 through the short-circuit switches 41–43 after the outgoing current becomes zero, and the leading currents (short-circuit currents) go out of the respective armature windings 11–13 through the short-circuit switches 41–43 after the outgoing current becomes zero, so that the current wave is approximated to the sinusoidal curve advancing the phase as shown in FIG. 6. As a result, the output power increases, and noise and vibration decrease.

As shown in FIG. 6, the armature voltage Va of an X-phase becomes lower than the battery voltage VB at a time t1. If the short-circuit switch 41 short-circuits the X-phase terminal and a Y-phase terminal at this time, a short-circuit current flows from the Y-phase armature winding 12 to the X-phase armature winding due to a voltage difference as a leading current $\Delta i1$. Since the armature voltage Va becomes lower than 0 V after time t2, the current flows to the armature winding 11 without the short-circuit switch being turned on. That is, the time period between t1 and t2 is the maximum short-circuit time $\Delta Tmax$. Although the current direction is opposite, time period between t3 and t4 is also the maximum short-circuit time $\Delta Tmax$, in which the short-circuit switch is turned on during the time period $\Delta T$ to allow the leading current $\Delta i2$ to flow from the armature winding 11 to the armature winding 12.

In this embodiment, the short-circuit switch is turned on when the leading current is supplied. If, however, the switch is turned on differently (for example, the short-circuit switch is turned on between t1 and t2), lagging current can be supplied in a different direction, so that the output current can be reduced without changing the field current.

In this embodiment, the leading current is controlled by changing the short-circuit time $\Delta T$, however, the leading current can be controlled by PWM-control at periods between t1 and t2 and between t3 and t4. The PWM control is not described here since it is well-known. In the above embodiment, the short-circuit switches 11–13 are turned on every half cycle. However, they can be turned on once in a number of cycles. Since the short-circuit switches 41–43 have suitable resistances when they are turned on, excessive short-circuit current is prevented by the resistances and the inductance of the armature windings 11–13.

After the short-circuit switch 41 is turned off between the time t1 and the time t2 in FIG. 6, the electromagnetic operation is as follows.

When the short-circuit time terminates (at time t1'), and the short-circuit current is not supplied, the phase-voltage Va is generally higher than the lower DC voltage terminal (0 V) and, therefore, the phase current Ix does not flow from the lower DC voltage terminal into the armature winding 11 after the time t1'.

However, if the short-circuit current is supplied to the armature winding 11 until the time t1', reverse electromotive force is generated in a direction to lower the output terminal voltage of the armature winding 11 or the phase voltage Va when the short-circuit switch is turned off. As a result, the phase voltage Va lowers by the voltage corresponding to the reverse electromotive force and becomes lower than the voltage (0 V) of the lower DC voltage terminal so that the generated current flows from the lower DC voltage terminal into the armature winding 11 through the diode 34.

In other words, the short-circuit current (leading current) brings the armature windings 11–13 electromagnetic energy, which is released after the time t1' The generated current after the time t1' is recovered from the higher DC terminal to the battery 10.

In this embodiment, since the leading current is supplied by the short-circuit switches 41–43, even if any of the switches can not turn off, the battery 10 does not discharge, resulting in a safe apparatus.

The armature windings 11–13 can be connected in the $\Delta$-connection instead of the Star-connection, and they are not limited to three-phase.

Figure 9:
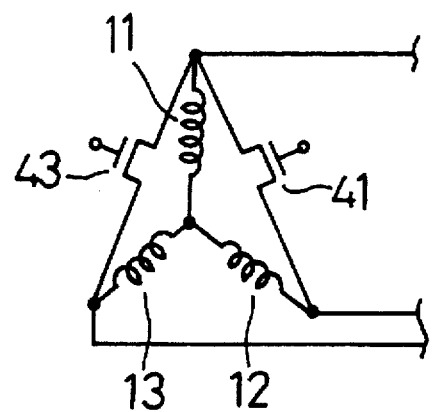
FIG. 9 is a circuit diagram illustrating a variation of the first embodiment.
Figure 10:
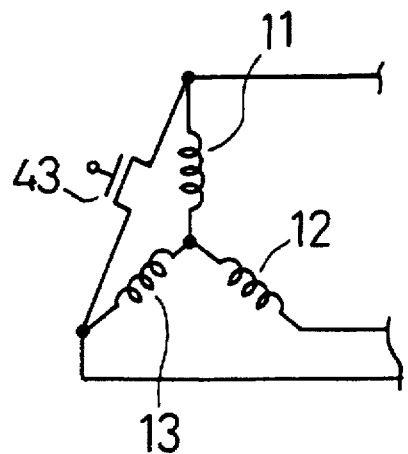
FIG. 10 is a circuit diagram illustrating another variation of the first embodiment.

Variations of the first embodiment are shown in FIG. 9 and FIG. 10. These variations use main portions of the first embodiment shown in FIG. 1. FIG. 9 illustrates a variation in which two phase terminals are short-circuited. FIG. 10 illustrates a variation in which only one of the phase terminals is short-circuited. These variations have the leading-current-effect with a simple circuit structure.

(Second Embodiment)

Figure 7:
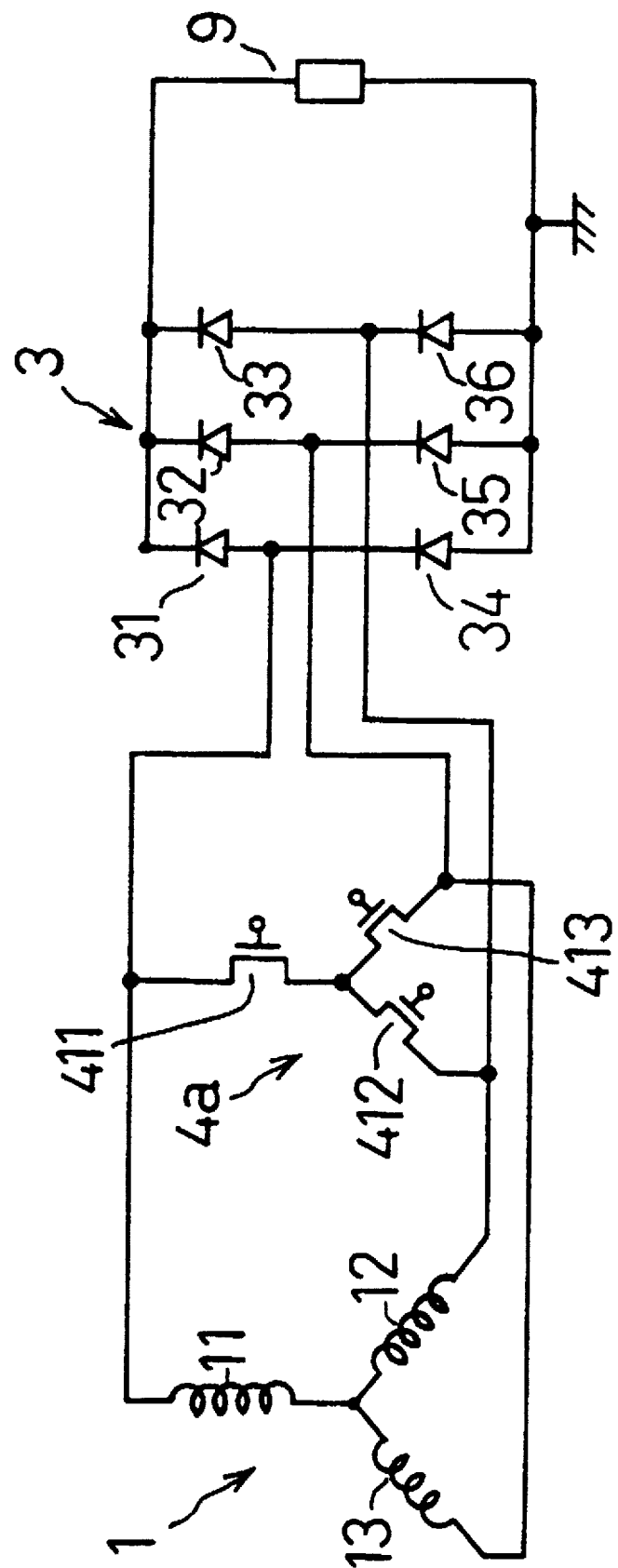
FIG. 7 is a circuit diagram illustrating a second embodiment.

Another embodiment is described with reference to FIG. 7.

This embodiment has a short-circuiting circuit 4a composed of short-circuit switches 411–413 connected in the star-connection. In this embodiment, the short-circuit switches 411 and 412 are turned on when the short-circuit switch 41 shown in FIG. 1 is turned on, the short-circuit switches 412 and 413 are turned on at the time when the short circuit switch 42 shown in FIG. 1 is turned on and the short-circuit switches 411 and 413 are turned on at the time when the short circuit switch 43 shown in FIG. 1 is turned on. Thus, the same effect as the first embodiment is ensured.
(Third Embodiment)

Figure 8:
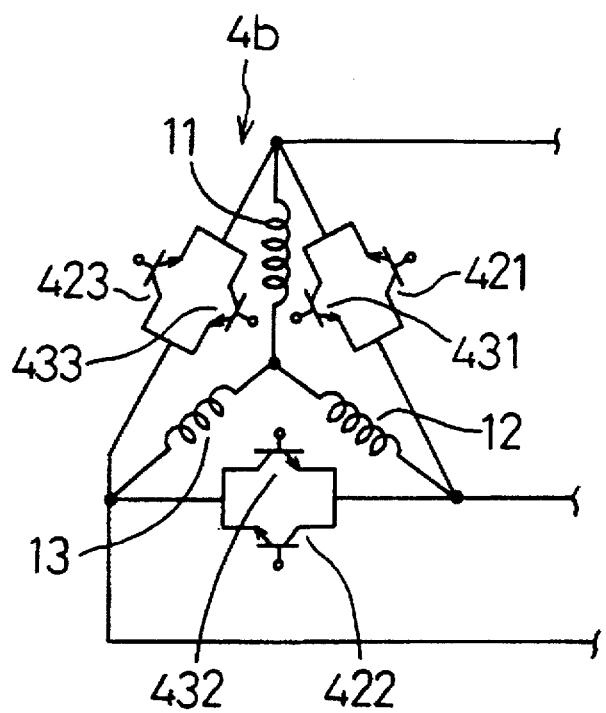
FIG. 8 is a circuit diagram illustrating a third embodiment.

A third embodiment is described with reference to FIG. 8.

In this embodiment, IGBTs 421 and 431 are used instead of the short-circuit switch 41, IGBTs 422 and 432 are used instead of the short-circuit switch 42 and IGBTs 423 and 433 are used instead of the short-circuit switch 43, to compose a Δ-connection type short-circuiting circuit 4b.

The IGBTs 421 and 431 are connected in parallel so that one allows the short-circuit current to flow in a direction opposite to the other, the IGBTs 422 and 432 are connected in parallel so that one allows the short-circuit current to flow in a direction opposite to the other and the IGBTs 423 and 433 are connected in parallel so that one allows the short-circuit current to flow in a direction opposite to the other. Each of the IGBTs 421–423 and 431–433 is turned on in a half wave period which is suitable for short-circuiting. The short-circuit time is set in the same manner as the first embodiment.

In the above embodiment, the short-circuit timing is set on the basis of the voltage difference across the opposite terminals of diodes 31–36. However, the timing can be set on the basis of the voltage difference across current detecting resistors which are connected in series with the diodes 31–36.

The short-circuit timing can be set on the basis of the absolute rotational angle of the alternator rotor which is detected by a rotary encoder.
(Fourth Embodiment)

Figure 11:
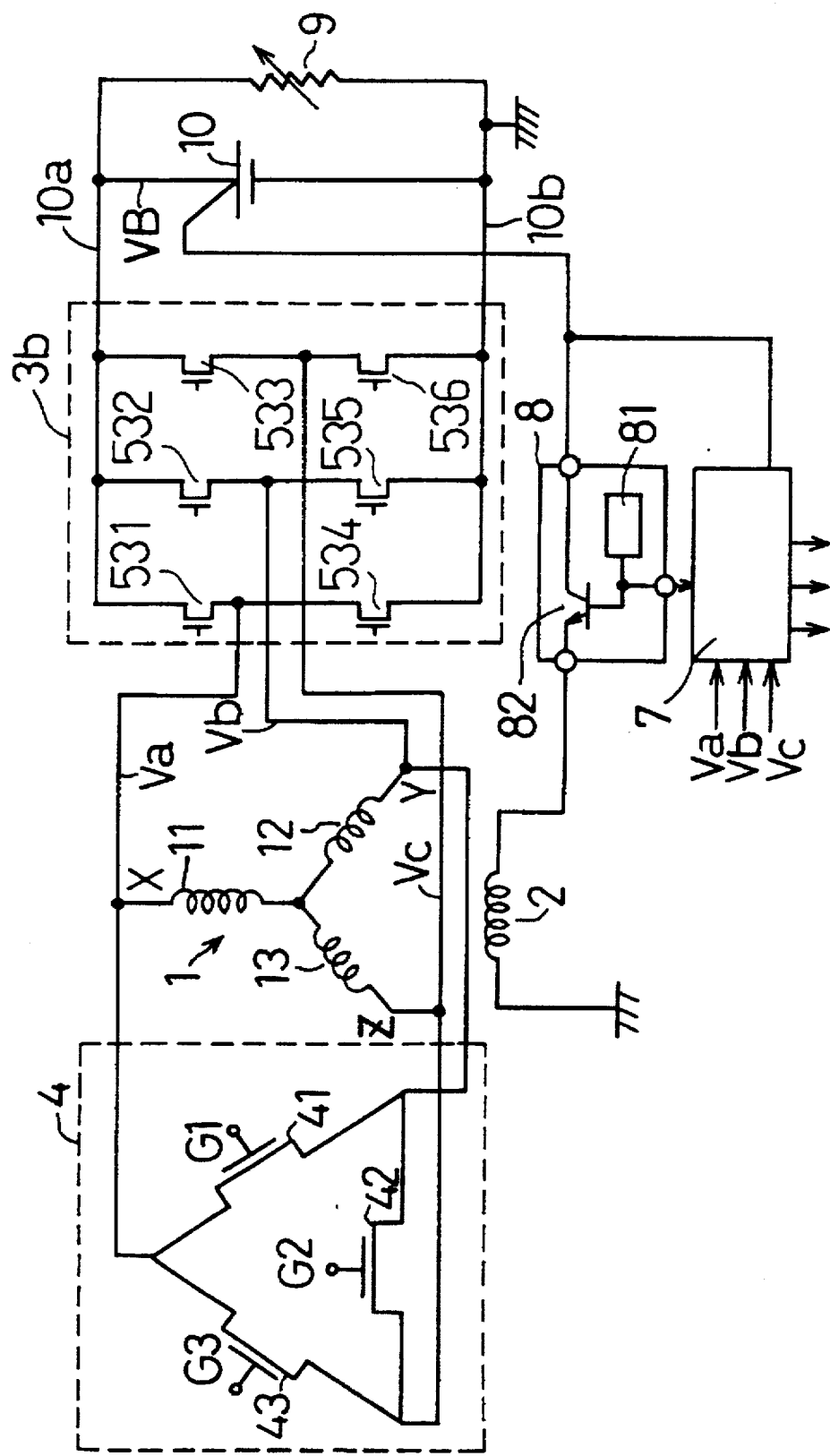
FIG. 11 is a circuit diagram illustrating a fourth embodiment.

The three-phase full-wave rectifier 3 of the first embodiment can be replaced with a three-phase inverter circuit 3b which is composed of semiconductor switching elements 531–536 made from such MOSFETs as shown in FIG.11. In this embodiment, the controller 7 controls the MOSFETs to turn on or off.

As a result, the leading current can be supplied to a rotary machine which switches from one to the other between the motor and the generator so that the generation power can be increased.

In the foregoing discussion of the present invention, the invention has been described with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than a restrictive, sense.

What is claimed is:

1. A generating apparatus including an alternator which includes multi-phase armature windings having respective phase terminals, said generating apparatus comprising:

means, connected between two of said phase terminals of said multi-phase armature windings, for bi-directionally short-circuiting said two phase terminals; and means, connected to said short-circuiting means, for controlling said short-circuiting means to supply current from one of said two phase terminals to the other, thereby controlling alternator-output-power.

2. A generating apparatus according to claim 1, wherein said short-circuiting means comprises a semiconductor switching element connected between said two phase terminals and said controlling means turns on and off said semiconductor switching element at a fixed timing to provide an approximated-sinusoidal-armature-current having a phase different from a phase of voltage induced in a corresponding one of said armature windings.

3. A generating apparatus according to claim 1, further comprising a full-wave rectifying unit composed of a plurality of diodes.

4. A generating apparatus according to claim 1, further comprising a two-way switching circuit, said two-way switching circuit comprising a high-side switch composed of a semiconductor switching element connecting an output terminal of one of said armature windings with a higher-voltage-terminal of a DC electric source and a low-side switch composed of a semiconductor switching element connecting an output terminal of one of said armature windings with a lower-voltage-terminal of said DC electric source.

5. A generating apparatus according to claim 2, wherein said alternator comprises a three-phase alternator and said short-circuiting means comprises a Δ-connected circuit composed of three of said semiconductor elements.

6. A generating apparatus according to claim 2, wherein said semiconductor switching element comprises a MOSFET.

7. A generating apparatus according to claim 6, wherein said MOSFET includes a high resistance member for preventing conduction of a parasitic diode.

8. A generating apparatus according to claim 6, wherein said MOSFET is formed from SiC.

9. A generating apparatus according to claim 2, wherein said semiconductor switching element comprises a pair of one-way semiconductor switching elements connected in parallel with each other so that one allows current to flow in a direction opposite to the other.

10. A generating apparatus according to claim 1, further comprising an AC-DC power converting unit that supplies a battery with electric current.

11. A generating apparatus according to claim 2, wherein said fixed timing that said controlling means turns on said semiconductor switching element includes a fixed conducting period which corresponds to a predetermined leading current.

12. A generating apparatus according to claim 11, further comprising means for detecting a physical value related to a rotational speed of said alternator, said controlling means adjusting said fixed conducting period with a maximum conducting period corresponding to said rotational speed.

13. A generating apparatus according to claim 2, wherein said fixed timing at which said controlling means turns on and off said semiconductor switching element is adjusted on the basis of a rotational speed of said alternator.

14. A generating apparatus according to claim 13, wherein said controlling means turns on said semiconductor switching element when a voltage difference between an output terminal of said armature windings and either a higher-voltage-terminal of a DC-voltage-source or a lower-voltage-terminal of said DC-voltage-source becomes smaller than an absolute value.

15. A generating apparatus according to claim 13, wherein said controlling means delays turning off said semiconductor switching element after a voltage difference between an output terminal of said armature windings and either a higher-voltage-terminal of a DC-voltage-source or a lower-voltage-terminal of said DC-voltage-source becomes smaller than an absolute value.

16. A generating apparatus comprising:

an alternator including three-phase armature windings having three respective phase terminals;

a three-phase full-wave rectifying unit;

a bi-directional switching unit, connected between two of said phase terminals of said three-phase armature windings, that short-circuits said two of said phase terminals for a controlled period; and a timing control unit, connected to said bi-directional switching unit, that controls said controlled period so as to supply current from one of said two of said phase terminals to the other, thereby controlling an amount of power output from said alternator.

17. A generating apparatus according to claim 16, wherein said timing control unit controls said controlled period so that no current flows through said rectifying unit.

18. A generating apparatus according to claim 17, wherein said bi-directional switching unit comprises a delta-connected circuit composed of three bi-directional semiconductor elements.

19. A generating apparatus according to claim 18, wherein said bi-directional semiconductor switching elements each comprise a MOSFET.

20. A generating apparatus according to claim 19, wherein said MOSFET includes a high resistance member for preventing conduction of a parasitic diode.

21. A generating apparatus according to claim 16, wherein said rectifying unit is connected to a DC voltage source having a high voltage terminal and a low voltage terminal, said timing control unit turning on said bi-directional switching unit when a voltage difference between one of said phase terminals and either one of said high voltage terminal and said low voltage terminal becomes smaller than a fixed absolute value.

22. A generating apparatus according to claim 16, wherein said rectifying unit is connected to a DC voltage source having a high voltage terminal and a low voltage terminal, said timing control unit delaying turning off said bi-directional switching unit for a fixed delay time after a voltage difference between one of said phase terminals and either one of said high and low voltage terminals becomes smaller than a fixed absolute value.

* * * * *